United States Patent [19]
Matsui

[11] 3,922,693
[45] Nov. 25, 1975

[54] CAMERA AUTOMATIC EXPOSURE CONTROL MECHANISM

[75] Inventor: Toru Matsui, Sakai, Japan

[73] Assignee: Minolta Camera Kabushiki Kaisha, Osaka, Japan

[22] Filed: May 2, 1974

[21] Appl. No.: 466,111

[30] Foreign Application Priority Data
May 5, 1973   Japan............................ 48-57828

[52] U.S. Cl. .................. 354/42; 354/47; 354/234; 354/244; 354/272; 354/266
[51] Int. Cl.² .................. G03B 7/08; G03B 17/38
[58] Field of Search .......... 354/26, 30, 36, 38, 228, 354/232, 266, 268, 241–244, 47, 42, 272, 271, 234–235

[56] References Cited
UNITED STATES PATENTS

| | | | |
|---|---|---|---|
| 3,777,637 | 12/1973 | Kuramoto et al. ............... | 354/44 X |
| 3,829,877 | 8/1974 | Kitai ............................ | 354/242 X |

*Primary Examiner*—Samuel S. Matthews
*Assistant Examiner*—James LaBarre
*Attorney, Agent, or Firm*—Wolder & Gross

[57] ABSTRACT

A camera includes an automatic preset objective lens diaphragm and a light measuring network including a photocell exposed to light traversing the diaphragm. An adjusting member is separably coupled to the diaphragm and swingable between a retracted diaphragm open position and a fully diaphragm closed advanced position and spring biased to advanced position. A brake member locks the adjusting member between its extreme position and is actuated by an electromagnet which is excited by the network when a predetermined amount of light is incident in the photocell and the actuated brake member also releases the shutter. In order to effect proper camera operation in the event of excessive light or depleted batteries there is provided a selectively actuatable mechanism which permits shutter release upon full advance of the adjusting member independently of the electromagnet excitation and also permits the retraction and cocking of the adjusting member independently of the camera winding operation.

9 Claims, 5 Drawing Figures

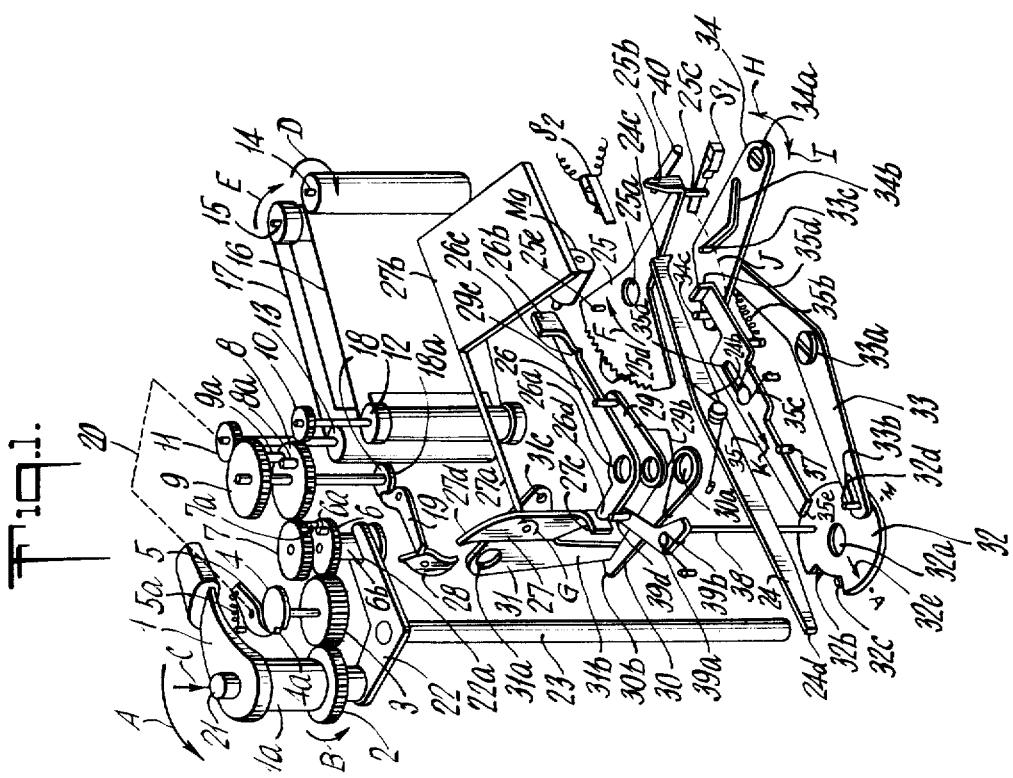

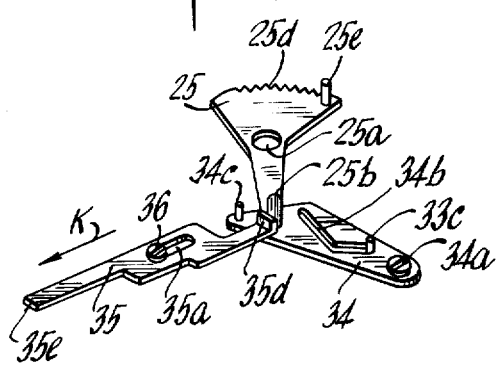
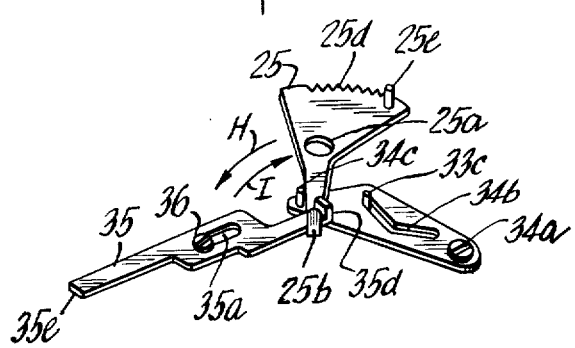
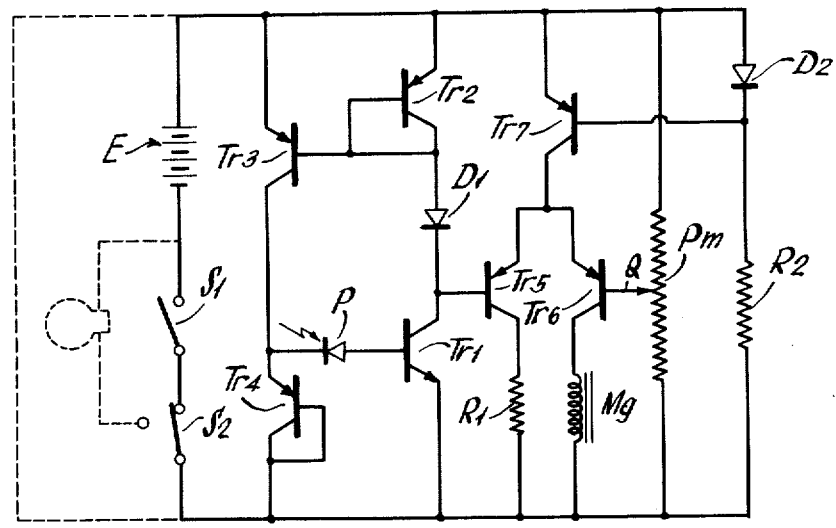

CAMERA AUTOMATIC EXPOSURE CONTROL MECHANISM

BACKGROUND OF THE INVENTION

The present invention relates to an automatic exposure control device wherein after the shutter speed and the film sensitivity has been preset, a diaphragm aperture is automatically controlled according to the preset values and the intensity of the light of a photographic object.

A device of the type described is known wherein the operation for adjusting the objective lens diaphragm to a reduced aperture value starts in cooperation with the shutter release operation, and when the intensity of light from a photographic object through the diaphragm is reduced to a proper value, with decrease in the diaphragm aperture, an electromagnet is excited, whereby the diaphragm is stopped at that value and at the same time the shutter releasing operation commences. (U.S. Pat. No. 3,777,637 issued Dec. 11, 1973).

The device, however, possesses the drawback that in the event that the voltage of the current source is depressed below a suitable operating level due to the consumption of the current source battery, with the failure in the proper excitation of the electromagnet, or in the event that the electromagnet remains unexcited, because the intensity of light from a photographic object is so strong that even if the diaphragm is set to the minimum aperture value, the intensity of the diaphragm traversing light exceeds a proper value, and the shutter release operation is not started, and hence photographing cannot be effected. In such cases, for effecting a subsequent photographing, it is imperative to return the diaphragm to its fully open position. However, the device of this type is so constructed that the diaphragm returning operation is effected in association with the film winding operation, and under the condition where the shutter remains locked, the film winding mechanism fails to be actuated and hence the camera assumes an inoperative condition, with the result of the failure of photographing.

SUMMARY OF THE INVENTION

It is thus a primary object of the present invention to provide an exposure control device in which diaphragm adjustment is selectively effected either automatically or manually.

Another object of the present invention is to provide means for switching the diaphragm from automatic control to manual control and vice-versa, in an automatic exposure control device.

A further object of the present invention is to provide an exposure control device, wherein in the event that an electromagnet fails to be excited upon the automatic diaphragm adjustment, the photographing may be effected by manually adjusting the diaphragm.

A still further object of the present invention is to provide means for restoring the camera of the above type to the normal condition for succeeding photographing, even if an electromagnet fails to be excited upon the automatic diaphragm adjustment and the camera assumes an abnormal condition.

BRIEF DESCRIPTION OF THE DRAWINGS

FIG. 1 is a perspective view of an improved mechanism embodying the present invention illustrated in a condition wherein the diaphragm is automatically adjusted;

FIG. 2 is a similar view to FIG. 1, but illustrated in a condition wherein the diaphragm is manually adjusted;

FIG. 3 is a perspective view of a section of the mechanism in the condition of FIG. 1;

FIG. 4 is a view similar to FIG. 3 but illustrated in the condition of FIG. 2; and FIG. 5 diagrammatically shows an exposure control circuit incorporated in the device of the present invention.

DESCRIPTION OF THE PREFERRED EMBODIMENT

Referring now to the drawings which illustrate a preferred embodiment of the present invention, the reference numerals 1 through 7 generally designate a film winding system which includes a winding lever 1 which is manually actuated to swing in the direction of the arrow A, and a film winding gear 2 which is rotated in the direction of the arrow B by a known mechanism consisting of a ratchet and pawl (not shown) to thereby rotate a gear 3 meshing with the gear 2, whereby the film is advanced. Rigidly mounted on the shaft of the gear 3 and rotatable therewith is a stop disc 4 having notch 4a in the periphery thereof, which engages a pawl of a stop lever 5 under the influence of a spring 5a when the film is advanced by one frame, thereby stopping the rotation of stop disc 4. Stop lever 5 is released from engagement with stop disc 4 by way of a connecting mechanism 20, in response to signals representing the termination of the release of the second or trailing shutter curtain gear as will be hereinafter described to thus permit a subsequent film winding operation. A shutter winding gear 6 meshes with gear 3 and is connected, by way of lost motion coupling pins 6a, 7a, with an idler gear 7 mounted on the shaft of gear 6.

Reference numerals 9 through 19 designate a shutter mechanism which includes a first curtain winding gear 8 meshing with the gear 7 and in meshing relation with a first or leading curtain gear 10 rigidly mounted on a shaft of first curtain winding drum 12. A second curtain winding gear 9 is in meshing relation with a second curtain gear 11 rigidly mounted on the shaft of a second curtain winding drum 13, said second curtain winding gear 9 being adapted to be connected, by way of lost motion coupling pins 8a, 9a, with the first curtain gear 8 when the first curtain winding gear 8 is charged. A lock disc 18 is mounted on coaxially and is integrally rotatable with the first curtain winding gear and has a notch which is engageable with a pawl on the shutter release lever 19, upon completion of the shutter cocking or charging, and thus the lock disc 18 is locked by shutter release lever 19.

A first shutter curtain 16 is wound around the first curtain winding drum 12 and a first curtain driving drum 14 normally urged or biased to rotate in the direction of the arrow D. A second curtain is wound around second curtain winding drum 13 and second curtain driving drum 15 normally urged or biased to rotate in the direction of arrow E. Reference numerals 21 through 30 designate a shutter release mechanism including a diaphragm operating mechanism and a mirror actuating mechanism. A release button 21 extends through a coaxial cylindrical portion 1a of the film winding lever 1 and winding gear 2 to engage an underlying release plate 22. Release plate 22 has a forked end portion 22a engaging the shaft 6b of the shutter winding gear 6, such that when release plate 22 is depressed, coupling between the pins 6a and 7a is released. Release plate 22 is also provided with a depending release rod 23 rigidly secured thereto. A release lever 24 is supported by a shaft 24a which in turn is journalled to the camera body. Release lever 24 is biased to rotate in a clockwise direction under the influence of a spring 24b such that an operating end 24c thereof tends to engage a diaphragm actuating member 25 which will be hereinafter described. The release lever 24 has its other end 24d engageable by the lower end of release rod 23 when the rod 23 is depressed.

A sector shaped diaphragm actuating lever 25 is rotatably mounted for swinging about a hole 25a engaging a shaft on the camera body and normally urged or biased to rotate in a clockwise direction, shown by the arrow F, under the influence of a spring not shown. Diaphragm actuating lever 25 is provided at an end with a bent piece or ear 25b and a first switch pin 25c and has at its opposite end an arcuate ratchet 25D, and second switch actuating pin 25e. The first switch pin 25c engages and actuates a normally closed switch S1 when the diaphragm actuating lever 25 is in its cocked or charged condition, so as to maintain the switch S1 open under such cocked condition. Second switch pin 25e engages and actuates a normally closed switch S2 upon the termination of the rotation of the diaphragm actuating lever 25 in the direction of arrow F, so as to maintain the switch S2 open against the normal closing thereof. A pin 40 is normally urged with an objective lens diaphragm in a closing direction and when the photographic objective lens is mounted on the camera, the pin engages bent piece 25b so as to maintain the diaphragm in its fully open position when the diaphragm actuating lever 25 is releasably locked in its charged position by engagement by the operating end 24c of release lever 24.

Referring to the exposure control circuit shown in FIG. 5, shown at E is a current source battery, which is connected in series relation with series connected switches S1, S2, between the emitter and collector of a transistor Tr3 through the emitter and collector of a transistor Tr4 whose base and collector is short-circuited and which has a diode characteristic. Connected in parallel with the series connected transistors Tr3 and Tr4 are series connected transistors Tr1 and Tr2, the emitter and collector of transistor Tr2 and the collector and emitter of transistor Tr1 being connected in series relation with each other, the transistor Tr2 having its base and collector short-circuited and having a diode characteristic, and the transistor Tr1 having a collector connected through a diode D1 to the collector of transistor Tr2. The collector of transistor Tr2 is connected to the base of transistor Tr3. The cathode of a photocell P which receives the light from a photographic object through the diaphragm is connected to the collector of transistor Tr3, and the anode thereof is connected to the base of transistor Tr1.

Transistors Tr2, Tr3 and Tr4 serve as a short-circuit between the anode and cathode of photocell P so as to prevent the generation of a dark current in photocell P, such that the photoelectric current of low intensity may be accurately measured.

When switches S1 and S2 are both closed, the short-circuit current generating in photocell P in response to the light rays from a photographic field which are incident on the photocell P is amplified by transistor Tr1, and the collector current of transistor Tr1 varies as an exponential function in proportion to the quantity of light incident on photocell P. On the other hand, between the emitter of transistor Tr2 and the cathode of diode D1, a voltage is produced by diode D1 and transistor Tr2 having a diode characteristic, in which the collector current of transistor Tr1 is logarithmically compressed. In other words, there is produced at the cathode of diode D1 a voltage in which the signal consequent to the intensity of light from a photographic object through the diaphragm is logarithmically compressed. The cathode of diode D1, that is, the collector voltage of transistor Tr1, is connected as an input to the base of transistor Tr5 which constitutes a differentially amplifying transistor circuit together with transistor Tr6. The transistor Tr5 may be a high input impedance transistor so that the base current is lowered so as to cause a negligible amount of current to flow through transistor Tr1, or the transistor Tr5 may be composed of two or three transistors for providing increased amplification. Resistor R1 is connected to the collector of transistor Tr5.

The base of transistor Tr6 is connected to the sliding element or arm Q of a potentiometer Pm, such that the base potential may be varied or adjusted by moving the sliding element Q according to the film sensitivity and the predetermined shutter speed. Connected to the collector of transistor Tr6 is the coil of an electromagnet Mg.

A transistor Tr7 has a collector, to which are connected emitters of transistors Tr5 and Tr6, a base connected to the junction point between the series connected diode D2 and resistor R2, which are connected across the battery E through switches S1 and S2, the transistor Tr7, diode D2 and resistor R2 serving to improve the characteristic of the differential and amplifying circuit.

The electromagnet Mg of the aforesaid exposure control circuit is disposed in the camera body proximate to the diaphragm actuating lever 25. Operating lever 26 has one arm provided with a magnetic defining section armature 26b facing a magnetic pole of electromagnet Mg and an engaging projection or detent 26c which engages or disengages the ratchet 25d of diaphragm actuating lever 25. Operating lever 26 is rotatably mounted by way of a shaft hole 26a on the camera body. Supported coaxially with operating lever 26 on the camera body is an actuating lever 29, which is normally urged to rotate in a counter-clockwise direction under the influence of a spring 29b and carries a pin 29c which is engageable with operating lever 26, whereby operating lever 26 is urged to rotate in the same direction as the actuating lever 29. Operating lever 26 is normally maintained in a position in which the armature 26b is spaced from the magnetic pole of electromagnet Mg and engaging projection 26c is disengaged from ratchet 25d, with the other arm end 26d being in engagement with an ear or bent piece 27c on mirror lever 27, so as to prevent the rotation of the mirror lever. Mirror lever 27 is rotatably journalled on the camera body and has shaft 27a which is rigidly secured thereto and has the camera swingable reflecting mirror 27b fixedly mounted thereon and rotatably therewith. Mirror lever 27 is normally urged or biased to be rotated in the direction of arrow G under the influence of a spring, not shown. When the electromagnet Mg is excited or energized and operating lever 26 is rotated in the clockwise direction against the bias thereof, engaging projection 26c is brought into engagement with ratchet teeth 25d, thereby locking the diaphragm actuating lever 25, whereby the rotation in the direction of arrow F of the diaphragm actuating lever is stopped. At the same time, the other arm end 26d of operating lever 26 disengages bent piece 27c of mirror lever 27, to thereby release mirror lever 27 from its locked position, whereby the mirror lever is allowed to rotate in the counter-clockwise direction, thereby rotatingly shifting the movable reflecting mirror 27b from its viewing position to the picture taking position.

An intermediate lever 28 has one arm projecting within the path of rotation of mirror lever 27 in a manner to be engageable with mirror lever 27. The other arm of intermediate lever 28 is in engagement with shutter release lever 19 which releasably locks the first curtain locking disc 18. Thus, the aforesaid rotation of mirror lever 27 from viewing position to the picture taking position causes the rotation of the shutter release lever 19, whereby the first curtain locking disc 18 is released from the engagement with shutter release lever 19.

Rotatably journalled by way of a shaft hole 31a on the camera body is a mirror returning lever 31, which is biased to rotate in a clockwise direction under the influence of a strong spring, not shown. Mirror returning lever 31 has one arm provided with a pin 31c engageable with mirror lever 27 and is arrested at the other arm end through the engagement with the finger or pawl 30b of a mirror return motion lock lever 30. The lock lever 30 is journalled on the camera body by means of a shaft hole 30a, coaxially with the operating lever 26 and is biased to rotate in a clockwise direction under the influence of spring 29b. When lock lever 30 is urged in the counter-clockwise direction against the influence of spring 29b by means of a known connecting mechanism, not shown, which produces signals in association with the termination of travel of second curtain, pawl 30b releases the other arm end 31b of mirror return lever 31, thereby allowing the clockwise rotation of the mirror return lever, whereby pin 31c of return lever 31 causes mirror lever 27 to rotate in a clockwise direction, thereby returning the reflecting mirror 27b from the picture taking position to the viewing position.

Mirror return lever 31 is rotated in a counter-clockwise direction against the bias thereof by a known mechanism, not shown, in association with the camera winding operation, until it is arrested by engagement by pawl 30b of check lever 30, as shown in FIGS. 1 and 2.

Reference numerals 32 through 39 designate automatic manual change-over system which is an important feature of the mechanism of the present invention. Rotatably mounted by way of a shaft hole 32a on the camera body is a switching or change-over disc 32, whose rotational angle is restricted by stop 32c projecting from the camera body and engageable with circumferentially extending cut-away portion or arcuate peripheral recess 32b provided in the change-over disc 32. If the change-over disc 32 assumes a position as shown in FIG. 1, indicia 32e on the change-over disc 32 registers with a point A provided on the camera body for indicating an automatic diaphragm control. On the other hand, if the change-over disc 32 is positioned as shown in FIG. 2, indicia 32 will point at point M provided on the camera body for indicating the manual diaphragm control. When the camera is operated by the manual diaphragm adjustment, a diaphragm setting ring (not shown) is pre-set at a desired diaphragm aperture value.

A connecting lever 33 has a slot 33b at one end which is slideably engaged by an operating pin 32d projecting from change-over disc 32. The connecting lever 33 is rotatably supported by a shaft 33a, which in turn is journalled in the camera body, and has the other end thereof provided with a pin 33c which is in free slideable engagement with a V-shaped cam slot 34b provided in a change-over lever 34. Change-over lever 34 is rotatably supported by a shaft 34a which in turn is journalled in the camera body. When the pin 33c is shifted in the V-shaped cam slot 34b from its one extremity to the other in response to rotation of operating pin 32d due to rotation of change-over disc 32, change-over lever 34 is caused to reciprocate once in the directions of arrows I-H, such that pin 34c provided at the free end of change-over lever 34 will be brought into engagement, when the lever 34 rotates in the direction of arrow I, with the arm of diaphragm operating lever 25, if the lever 25 is disengaged from release lever 24 and assumes the released position through the rotation in the direction of arrow F, thereby rotating the diaphragm operating lever 25 in the counterclockwise direction against the bias thereof until it is brought into engagement with release lever 24, and thus the diaphragm operating lever 25 is brought to a diaphragm open position.

A manipulating lever 35 is engageable with the operating pin 32d and is slideably rotatably supported by pin 36, which in turn is journalled in the camera body, the pin 36 freely slideably engaging the slot 35a in lever 35. Manipulating lever 35 is biased to rotate in a counter-clockwise direction under the influence of a spring 35c, with its other arm slideably abutting a pin 37 rigidly mounted on the camera body, while the manipulating lever is urged in a direction reverse to the arrow K under the influence of a spring 35b. The manipulating lever 35 has bent piece or ear 35d at one end and an operating end 35e at the other end.

An actuating lever 39 is provided with a pin 38 engageable with the operating end 35e of lever 35 and is provided with a pin 39d abutting and engaging the operating lever 26. The lever 39 is supported by a shaft 39a which in turn is journalled in the camera body. The lever 39 is biased to rotate in a counter-clockwise direction under the influence of a spring 39b.

If the change-over disc 32 is set to the automatic control position A as shown in FIG. 1, change-over operating pin 32d assumes a position spaced from manipulating lever 35 and manipulating lever 35 is in abuttment with pin 37 under the influence of spring 35c, such that bent piece 35d of the lever 35 assumes a retracted position from the locus or path of rotation J of bent piece 25b of diaphragm actuating lever 25, with the operating end 35e of the lever 35 being positioned out of engagement with pin 38, as shown in FIGS. 1 and 3. On the other hand, if the change-over disc 32 is set to the manual control side M, change-over operating pin 32d is brought into engagement with manipulating lever 35, to thereby urge it in a clockwise direction against the bias of spring 35c, whereby the bent piece 35d of lever 35 will be positioned in the vicinity of the terminal of the locus or path of rotation of bent piece 25b, so as to engage bent piece 25b of diaphragm actuating lever 25 rotated from the position of FIG. 2 to the position of FIG. 4. Thus, the manipulating lever 35 is urged in the direction of arrow K by the bent piece 25b, such that operating end 35e of said lever will be brought into engagement with pin 38.

In operation, if the change-over disc 32 is set to the automatic control position A as shown in FIG. 1 and then, release button 21 is depressed upon completion of film winding, release lever 24 releases diaphragm actuating lever 25 from its locked position to thereby release it to rotate in the direction of arrow F, whereby the actuating switch S1 is closed and at the same time the diaphragm starts moving in an aperture closing direction.

Thus, photocell P in the exposure control circuit impresses the output voltage on the base of transistor Tr5 of the differential amplifying circuit commensurate with the logarithmic value of the intensity of the light incident on photocell P from a photographic object through the diaphragm, while the voltage commensurate with a preset shutter speed and film sensitivity is applied as an input to transistor Tr6 by potentiometer Pm. Thus, transistor Tr5 is first rendered conductive while transistor Tr6 is non-conductive. When the base voltage of transistor Tr5 becomes equal to a level of base voltage of transistor Tr6 with the progress of the diaphragm closing motion, then both transistors Tr5 and Tr6 are reversed, thereby exciting electromagnet Mg. Consequently, operating lever 26 is caused to rotate by electromagnet Mg in the clockwise direction, whereby the engaging projection 26c thereof engages teeth 25d of diaphragm actuating lever 25 so as to stop the rotation of the lever 25 in the direction of arrow F, while the other arm end 26d releases mirror lever 27, so as to allow the rotation of the reflecting mirror 27b from the viewing position to the picture taking position. Upon termination of the rotation of reflecting mirror 27b to the picture taking position, shutter release lever 19 is actuated, whereby the shutter is released at a preset shutter speed.

However, in the event that the voltage in potential source E is lower than a predetermined voltage level, the rotation of operating lever 26 by electromagnet Mg is not accomplished, and hence neither rotation of the reflecting mirror 27b, nor shutter release, nor the locking of the diaphragm actuating lever 25 is effected, with the result that the diaphragm is closed to the minimum diaphragm aperture.

Consequently, the camera is put in an inoperative condition, in which the diaphragm actuating lever alone is released, with the movable reflecting mirror and the shutter mechanism remaining unreleased. In addition, since stop lever 5 is maintained in engagement with the winding disc to retain it in the locked position, the film winding operation is prevented with the resulting disabling of the recharging the diaphragm actuating lever 25.

Such an inoperative condition is readily observed by a photographer, because the visual field in the view finder remains dark. To provide the information of the occurrence of such an inoperative condition to a photographer, the switch S2 may be replaced by a change-over switch so that the change-over switch may be transferred to complete a warning circuit, or otherwise, there may be separately provided a normally open switch S3 which is closed by the rotation of the diaphragm actuating lever 25.

In the mechanism of the present invention, in the event that the above abnormality in the camera arises, the change-over disc 32 is turned to the manual control position M. This causes change-over lever 34 to reciprocate in the directions of arrow I and H, whereby pin 34c of lever 34 engages the arm portion of diaphragm actuating lever 25 to urge it in a direction reverse to that of the arrow F, until the diaphragm actuating lever engages release lever 24. Thus, the diaphragm actuating lever 25 is charged, and the camera becomes operable.

Simultaneously with the movement described, operating pin 32d causes manipulating lever 35 to rotate in the clockwise direction, such that bent piece 35d thereof is engageable with bent piece 25b, and thus the camera is completely adjusted to the condition in which manual diaphragm adjustment may be accomplished.

For photographing, with the camera being maintained in the condition last described, the diaphragm presetting ring of the camera automatic preset objective lens is manually rotated to a selected diaphragm aperture. Then, if release button 21 is depressed diaphragm actuating lever 25 is released. In the course of the rotation of the lever 25 in the direction of arrow F after the lever has been released, pin 40 alone is stopped at the preset diaphragm aperture value, while diaphragm actuating lever 25 continues to rotate in the direction of arrow F, with pin 40 being disengaged at that position, whereby bent piece 25b engages bent piece 35d to urge the manipulating lever 35 in the direction of arrow K. Thus, actuating lever 39 is rotated in the clockwise direction by way of pin 38, such that the pin 39d thereof will cause operating lever 26 to rotate in the clockwise direction, such as in the case where electromagnet Mg is excited. Accordingly, mirror lever 27 is released to rotate mirror 27b. The instant the mirror reaches the picture taking position, shutter release lever 19 is actuated to release the shutter.

Upon termination of the shutter release operation, the connecting mechanism 20 releases the winding system from its locked position, while mirror return lever 31 causes the mirror 27 to return to the viewing position for subsequent photographing. These movements are quite the same as in the known device.

Even if the voltage in the potential source battery E is above its operative voltage level, in case a photographic object is too bright, the quantity of light received by photocell P may still be too large even if the diaphragm is reduced to the minimum aperture by the diaphragm actuating lever, so that transistor Tr6 still remains non-conductive, with the failure of shutter release. In such case, if change-over disc 32 is switched from the automatic control side A to the manual control side and back again to the automatic control side, then the diaphragm actuating lever 25 will be charged such that an automatic exposure control for subsequent photographing will be permitted.

In the aforementioned case, pin 25e of diaphragm actuating lever 25 causes the normally closed switch S2 to open when at the minimum diaphragm aperture value, such that the exposure control circuit becomes inoperative, and there is no risk that the shutter is unintentionally released due to the lowering in the intensity of light from a photographic object until the switching of change-over disc from the automatic side to the manual side and back to the automatic side is accomplished.

The mechanism of the embodiment described above is so constructed that the diaphragm is controlled when the electromagnet Mg is excited, and the construction may be modified by providing the electromagnet Mg with permanent magnet core having an opposite polarity to the magnetic field of the coil of the electromagnet when the coil is energized, so that the permanent magnetic force of the magnetic core usually attracts the operating lever 26 to the electromagnet against the force of spring, with its projection 26c being maintained in disengagement from teeth portion 25, and when the polarity of electromagnet Mg is neutralized due to the exitation of the coil, then the armature 26b of operating lever 26 is released, so as to control the diaphragm. In this case, the exposure control circuit shown in FIG. 5 may be used without any change.

If it desired that the diaphragm control is effected by breaking the current to the coil of electromagnet Mg for demagnetizing the electromagnet Mg, the electromagnet Mg in FIG. 5 may be connected to the collector of transistor Tr5 of the differential and amplifying circuit, in place of being connected to transistor Tr6. The construction of other members is such that, like the embodiment described, there are provided: members 32, 33, 34 for charging or cocking the diaphragm actuating member 25 in association with the switching of change-over member 32 from A to M and back to A; members for actuating reflecting mirror driving member and shutter release member due to the release of diaphragm actuating member 25; and lock means for locking operating lever 26 adapted to be operated by the electromagnet, when the potential source voltage E, detected prior to the release of diaphragm actuating member 25, is lower than a given level, said lock means being adapted to unlock the operating member due to the change-over disc being switched to the manual control side, in association with the release of the diaphragm actuating member 25. With such provisions, the diaphragm control can be readily effected.

While there have been described and illustrated a preferred embodiment of the present invention, it is apparent that numerous alterations, omissions and additions may be made without departing from the spirit thereof.

I claim:

1. In a camera automatic exposure control device including means for adjusting the camera diaphragm aperture biased in the direction reducing the diaphragm aperture, means for releasably locking said adjusting means at a charged fully open diaphragm aperture position, means for releasing said adjusting means in accordance with shutter release operation of the camera, an electromagnet, means including an exposure control circuit having a photo-sensitive element receiving incident light from an object through said diaphragm aperture for energizing said electromagnet when the intensity of said incident light is reduced to a predetermined value, means for opening the camera shutter, and means for stopping said adjusting means and for actuating said shutter opening means when actuated by said energized electromagnet, the improvement which comprises:

second means for actuating said shutter opening means; means for selectively, alternatively intercoupling and uncoupling said adjusting means and said second means and including means shiftable between an effective position enabling engagement between said adjusting means and said second means and an ineffective position preventing engagement between said adjusting means and said second means; and means for manually transferring said shiftable means from said ineffective to effective position, whereby the action of said adjusting means upon release thereof by said releasing means is transmitted to said second means through said shiftable means to open the shutter independently of the condition of said electromagnet.

2. The automatic exposure control device as in claim 1, wherein said adjusting means includes a movable member releasably locked in charged position and releasable to move toward a rest position whereby said diaphragm aperture is reduced with the movement of said movable member from said charged to said rest position, said movable member being provided with an engageable section, and said shiftable means is provided with a section engageable in said effective position with said engageable section of said movable member moving to said rest position, said shiftable means being slideable in said effective position, whereby said shiftable means in said effective position is slid into engagement with said second means with the engagement of the engageable sections of said movable member and said shiftable means to open the shutter.

3. The automatic exposure control device as in claim 2, wherein said second means includes a rotatable member engageable with said stopping means and rotated by engagement with said shiftable means slid by said movable member to advance said stopping means into said energized electromagnet actuated condition whereby to open the shutter independently of the condition of said electromagnet.

4. The automatic exposure control device as in claim 1, further comprising means for advancing said adjusting means into its releasable locked charged condition in response to the operation of said manual transferring means.

5. The automatic exposure control device as in claim 4, wherein said adjustment means is a movable member locked in said charged position and releasable to a rest position, and said advancing means includes a reciprocating member inter-connected with said transfer means and movable between advanced and retracted positions, said reciprocating member being normally positioned in said retracted position and movable to said advanced position thereupon driving said movable member from said rest position to said charged position in response to said operation of the manual transferring means, said reciprocating member returnable to said retracted position upon termination of said operation of the manual transferring means.

6. In a camera including a shutter and an objective lens adjustable diaphragm, an exposure control mechanism comprising a photosensitive element exposed to light traversing said diaphragm, a diaphragm adjusting member moveable between an advanced diaphragm closed position and a retracted diaphragm fully open position and biased to its advanced position, first means responsive to a predetermined amount of light being incident on said photosensitive element for braking said adjusting member during the advance movement thereof and for releasing said shutter, second means for releasing said shutter independently of said first means, and selector means for selectively enabling and disabling said second means.

7. The mechanism of claim 6 including means responsive to the movement of said selector means between its disabling and enabling positions for retracting and charging said adjusting member.

8. The mechanism of claim 6 wherein said first means comprises an electromagnet transferrable in response to said photocell incident light between first and second excitement states, and a member including an armature motivated by said electromagnet between an advanced position braking said adjustment member and releasing said shutter and a retracted position, and second means includes means for advancing said member independently of the state of said electromagnet.

9. The mechanism of claim 6 including means for locking said adjusting member in its retracted charged position and manually actuatable means for releasing said adjusting member.

* * * * *